United States Patent
Tzirkel-Hancock et al.

(10) Patent No.: US 9,539,944 B2
(45) Date of Patent: Jan. 10, 2017

(54) SYSTEMS AND METHODS OF IMPROVING DRIVER EXPERIENCE

(71) Applicant: GM GLOBAL TECHNOLOGY OPERATIONS LLC, Detroit, MI (US)

(72) Inventors: Eli Tzirkel-Hancock, Ra'anana (IL); Omer Tsimhoni, Ramat Hasharon (IL); Ziv Hermon, Maccabim (IL)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/732,401

(22) Filed: Jun. 5, 2015

(65) Prior Publication Data
US 2015/0360608 A1    Dec. 17, 2015

Related U.S. Application Data

(60) Provisional application No. 62/010,815, filed on Jun. 11, 2014.

(51) Int. Cl.
| | | |
|---|---|---|
| G07C 5/00 | (2006.01) |
| G05B 1/00 | (2006.01) |
| B60Q 9/00 | (2006.01) |
| B60Q 5/00 | (2006.01) |
| G08B 6/00 | (2006.01) |
| B60N 2/48 | (2006.01) |
| B60R 11/02 | (2006.01) |
| B60N 2/44 | (2006.01) |

(52) U.S. Cl.
CPC ............... B60Q 9/00 (2013.01); B60N 2/4876 (2013.01); B60R 11/0217 (2013.01); G08B 6/00 (2013.01); *B60N 2002/4485* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,711,221 B2* | 4/2014 | Eggert | .................. | G06T 7/208 348/143 |
| 2005/0013459 A1* | 1/2005 | Maekawa | ........... | B60R 11/0217 381/349 |
| 2006/0186651 A1* | 8/2006 | Aoki | ........................ | B60R 1/00 280/735 |
| 2010/0033313 A1* | 2/2010 | Keady | .................. | G08G 1/0965 340/438 |

* cited by examiner

*Primary Examiner* — Yonel Beaulieu
(74) *Attorney, Agent, or Firm* — Mickki D. Murray, Esq.; Parks IP Law LLC

(57) ABSTRACT

A vehicle apparatus includes a seat and a transducer configured to vibrate such that a vibration is felt by a person sitting in the seat. A transducer control signal that is transmitted to the transducer is based on output from a sensor of the apparatus configured to measure data including parameters indicative of at least one of a vehicle system function, a vehicle environment, and driver state, or on output from the vehicle system indicating parameters related to the vehicle system, vehicle environment, or driver state.

20 Claims, 2 Drawing Sheets

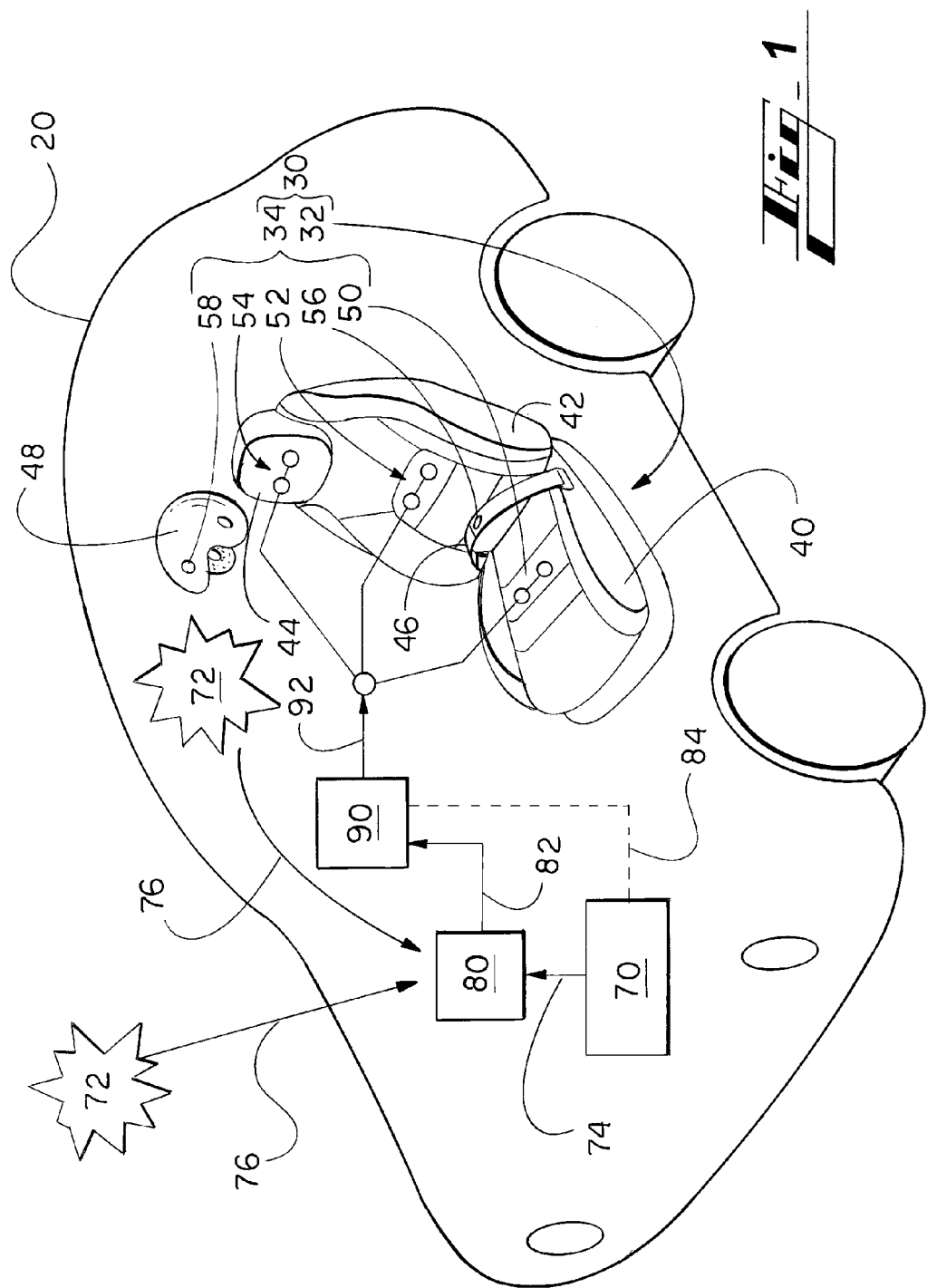

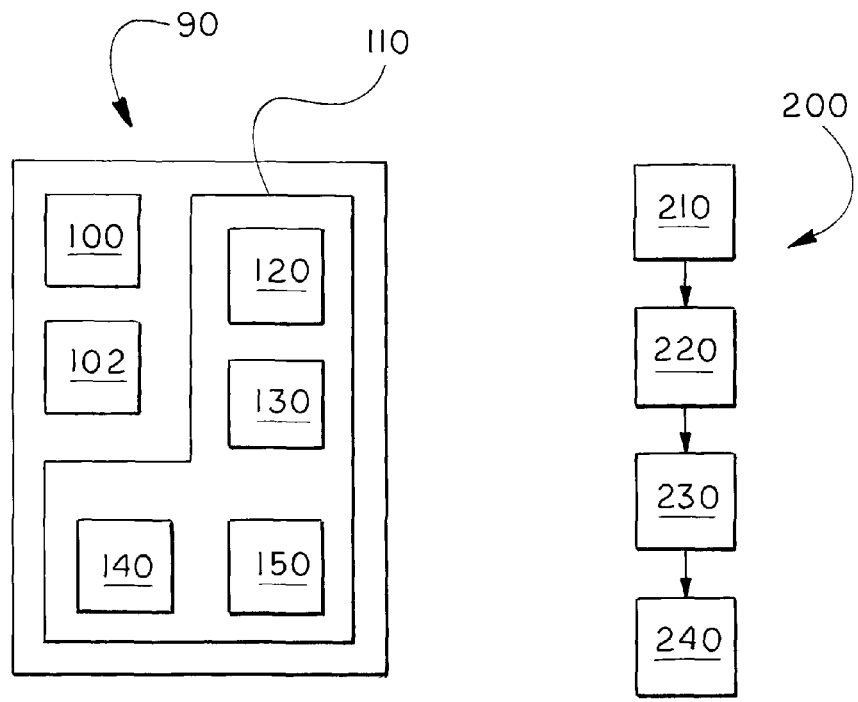
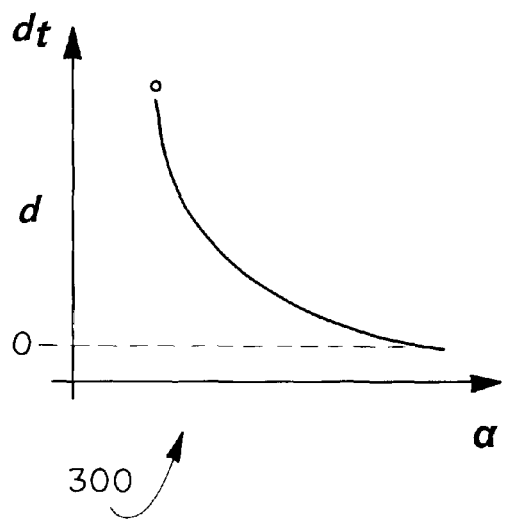
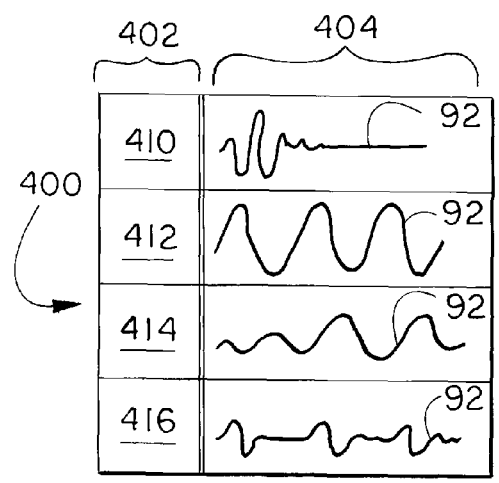

SYSTEMS AND METHODS OF IMPROVING DRIVER EXPERIENCE

TECHNICAL FIELD

The present disclosure relates generally to systems and methods of improving driver experience.

BACKGROUND

A driver's experience in a vehicle, including communication between the vehicle and the driver, impacts the entertainment of the driver and how well the driver operates the vehicle. A need exists in the industry to improve the driver's experience in a vehicle.

SUMMARY

The present technology relates to systems and methods to improve driver experience.

DESCRIPTION OF THE DRAWINGS

FIG. 1 illustrates schematically a vehicle, according to an embodiment of the present disclosure.

FIG. 2 illustrates a computing device of the vehicle, according to an embodiment of the present disclosure.

FIG. 3 is a block diagram illustrating a method, according to an embodiment of the present disclosure.

FIG. 4 is a graphical illustration of function, according to an embodiment of the present disclosure.

FIG. 5 is a graphical illustration of a conversion chart, according to an embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, and other vehicles.

According to an embodiment illustrated in FIG. 1, a vehicle 20 includes a driver vibration system 30. The driver vibration system 30 includes a seat 32 and an array of transducers 34 that are integrated into the seat 32, a wearable device, other structures of the vehicle 20 in contact with the driver, and the like. In alternative embodiments, the transducers are attached to such features.

The seat 32 includes a seat bottom 40, a seat back 42, a headrest 44 and a seatbelt 46. In certain embodiments, wearable devices (e.g., a wearable article and a transducer, described below) are worn by a driver while sitting in the seat 32. Wearable articles include a helmet, a vest or other articles of clothing, shoes glasses, a watch, a wristband, and the like. For purposes of teaching, a helmet 48 is illustrated.

The illustrated array of transducers 34 includes a pair of seat bottom transducers 50 positioned in the seat bottom 40; a pair of seat back transducers 52 positioned in the seat back 42; a pair of headrest transducers 54 in the headrest 44; a seatbelt transducer 56 positioned in the seatbelt 46; and a wearable transducer 58 positioned in the wearable article (e.g., the helmet 48).

In various embodiments, the number and position of transducers 34 are selected to meet needs of or desires for particular situations. The transducers 34 are, in one embodiment, multi-frequency vibrating devices used to transfer a vibration to a person sitting in the seat 32. For example, the transducers 34 are tactile transducers. The transducers 34 can track a complex signal (e.g., music signals) in a certain frequency range. Complex audio signals include those that are not fixed in both frequency and amplitude.

The vehicle 20 further includes vehicle systems 70, sensors 80, and a computing device 90.

The vehicle systems 70 include, for example, any of a heating system, an air conditioning system, a braking system, an acceleration system, an entertainment or infotainment system (e.g., a radio and/or video playing system), a navigation system, a mirrors system (e.g., mirror adjustment systems), a seat system (e.g., seat adjustment systems), a window-control system, a door system (e.g., door lock control systems), a collision-avoidance systems a traction-control system, a horn system, a windshield-wiper system, a belt and/or hose system, an emission system, an engine, engine-cooling system, an exhaust system, a lighting system, a wiper system, a vehicle-starting system, a charging system, a batteries system, a steering system, a suspension system, transmission system, a switch system, an HVAC system, a camera system, communication devices (e.g., OnStar devices and other wireless communication devices), systems that connect to auxiliary devices (e.g., Bluetooth devices, cellular phones), a cluster system, a center stack system, a heads-up display (HUD) system, a speech system, a gesture system, a sound system, and the like.

The sensors 80 measure phenomena or characteristics and generate output data 82 indicative of the measured characteristics. Measured phenomena or characteristics include system characteristics 74 of the vehicle systems 70 and environmental characteristics 76 from an environment 72 (inside or outside) of the vehicle 20. Environmental characteristics 76 (e.g., sound in the vehicle, distance to objects around the vehicle) reflect the environment associated with the vehicle 20 and system characteristics 74 reflect the status or performance of the vehicle systems 70. Similarly, control sensors measure driver input actions applied using control mechanisms for the vehicle systems 70 and driver-state sensors measure driver-state characteristics.

For example, environmental sensors can include temperature sensors, traffic sensors, road type (e.g., highway, urban) sensors, weather (e.g., rain) sensors, occupancy sensors, cameras that measure distance to an object, a microphone, and the like.

For example, vehicle-system sensors can include a gas tank level sensor, speed sensors, sensors associated with the vehicle systems 70 described above, and the like.

Driver state may be a directly-measured parameter or may be identified from a measured parameter. Driver state (e.g., emotional state, cognitive state, etc.) can be determined based on driver behavior (e.g., irritation, distraction), physiology (e.g., cognitive overload, fatigue), and the like that the system can recognize through analysis of measurements of parameters such as heart rate, driving time, steering behavior, galvanic skin response, Electroencephalography (EEG), driving behavior, speech detection, combinations thereof, and the like.

As provided, the sensors 80 can measure any of a wide variety of phenomena or characteristics. Sensors 80 can measure, as further example, ignition position or states of the vehicle, whether the vehicle is being turned off or on, whether or to what degree the vehicle is within a distance of a location, a type of weather (e.g., rain), a level of weather (e.g., amount of rain), an outside temperature, an outside humidity, an outside wind temperature, a cabin temperature, a vehicle speed, occupancy of a seat in the vehicle, weight of an occupant of a seat in the vehicle (e.g., to identify occupancy and distinguish between a child and adult), who is in the cabin (e.g., as identified by the presence of auxiliary devices that are specific to a user), vehicle state (e.g., amount of gas in the tank, cabin temperature, amount of oil), driver state (e.g., how long the driver has been driving and how they are driving (e.g., erratically)), general conditions (e.g., weather, temperature, day, time), driving conditions (e.g., road type, traffic), and the like.

The computing device 90 is connected to the sensors 80 and, in some embodiments, connected directly to one or more of the vehicle systems 70 by a direct connection 84.

According to an illustrated embodiment, each of the array of transducers 34 is connected to the computing device 90 and thereby configured to receive a control signal 92—e.g., transducer control signal—from the computing device 90. For example, each of the array of transducers 34 is hardwired or wirelessly connected to the computing device 90.

In alternative embodiments, transducers 34 are connected to vehicle systems 70 and thereby configured to receive a control signal from a vehicle system 70.

The computing device 90 is configured to receive or access output—e.g., the output data 82 from the sensors 80, or output received directly from vehicle systems 70, to generate a control signal 92 based on the output, and to transmit the control signal 92 to the array of transducers 34, as described in further detail below.

Referring to FIG. 2, the computing device 90 includes a processor 100 for controlling and/or processing data, input/output data ports 102, and a memory 110—e.g., a non-transitory computer-readable storage device or system.

The processor could be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations," this could include the processor performing the operations directly and/or facilitating, directing, or cooperating with another device or component to perform the operations.

The computing device 90 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the computing device 90.

While the memory 110 is illustrated as residing proximate the processor 100, it should be understood that at least a portion of the memory can be a remotely-accessed storage system, for example, a server on a communication network, a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 110 includes several categories of software and data used in the computing device 90, including applications 120, a database 130, an operating system 140, and input/output device drivers 150.

As will be appreciated by those skilled in the art, the operating system 140 may be any operating system for use with a data processing system. The input/output device drivers 150 may include various routines accessed through the operating system 140 by the applications to communicate with devices, and certain memory components. The applications 120 can be stored in the memory 110 and/or in a firmware (not shown) as executable instructions, and can be executed by the processor 100.

The applications 120 include various programs that, when executed by the processor 100, implement the various features of the computing device 90. The applications 120 include control signal applications 120, described in further detail below.

The applications 120 may use data stored in the database 130, such as that of characteristics measured by the sensors 80 (e.g., received via the input/output data ports 102). The database 130 includes static and/or dynamic data used by the applications 120, the operating system 140, the input/output device drivers 150 and other software programs that may reside in the memory 110.

The control signal application 120 is configured to generate the control signal 92. The control signal 92 controls the vibration of output (e.g., generated motion) of the array of transducers 34, as described in further detail below.

It should be understood that FIG. 2 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 2.

While the description refers to computer-readable instructions, embodiments of the present disclosure also can be implemented in combination with other program modules and/or as a combination of hardware and software in addition to, or instead of, computer readable instructions.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

FIG. 3 shows a method 200 according to an embodiment of the present disclosure. It should be understood that the steps of methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated methods can be ended at any time. In certain embodiments, some or all steps of this process, and/or substantially equivalent steps are performed by execution of computer-readable instructions stored or included on a computer readable medium, such as the memory 110 of the computing device 90 described above, for example.

A control signal application 120 includes computer-executable instructions that, when executed by the processor 100, cause the processor 100 to perform the steps of the method 200. According to a first step 210 of the method 200, the processor 100 receives or accesses output data 82. As mentioned above, output data 82 is generated by at least one sensor 80 as a result of sensing characteristics of the environment (e.g., environmental characteristics 76) within and outside of the vehicle 20, the status or performance of vehicle systems 70 (e.g., system characteristics 74), inputs to a vehicle system 70 using a control mechanism (e.g., driver actions), and generally characteristics pertaining to driver state (e.g., the behavior and condition of the driver— environmental characteristics 76).

According to a second step 220 of the method 200, the processor 100 analyzes the output data 82 that is received. Analysis includes application of a function and identification of a metric. Generally, output data 82 from a plurality of sensors 80 (and/or from components of vehicle systems 70 (e.g., output data via direct connection 84)) is received and analyzed. For purposes of clarity, output data 82 from a single one of the sensors 80 is illustrated and described in detail.

According to a third step 230, based on the analysis of the output data 82 at the second step 220, the processor 100 generates a control signal 92 (e.g., determines the type or level of vibration to be indicated by a control signal 92). For example, the processor 100 accesses a predefined control signal 92 based on a metric, transforms output data 82 using a function, or selects a control signal 92 from a conversion chart 400 (see FIG. 5, described in further detail below) based on a metric. Predefined signals, transformed data, and conversion charts can be accessed from the memory 110. For example, the conversion chart 400 may be a part of the database 130, for instance.

According to a fourth step 240, the processor 100 transmits the control signal 92 generated at the third step 230 to at least one transducer of the array of transducers 34. The transducer(s) 34 vibrate according to the control signal 92 and the vibration is felt by a person in the seat 32.

Music Enhancement

According to an exemplary embodiment, the vehicle system 70 produces an audio output. For example, the vehicle system 70 is a music system, entertainment system, radio, or the like. For purposes of description of this embodiment, the vehicle system 70 is referred to as an audio vehicle system 70.

The audio output of the audio vehicle system 70 is filtered and the filtered audio output is a control signal 92 that is transmitted to the array of transducers 34. For example, the audio vehicle system 70 is directly connected to the computing device 90 by the direct connection 84. The computing device 90 filters the audio output (e.g., by a filtering control signal application 120). In other embodiments, the audio output of the audio vehicle system 70 is filtered by an equalizer or the like and then transmitted to the array of transducers 34. In certain embodiments, the filter is a low-pass filter, or the like, such that filtered audio output is low frequency (e.g., 20-100 Hz).

The transducers 34 improve the quality of the audio output that is perceived by the driver, such as by adding or emphasizing low frequencies that may otherwise be lost or diluted when transmitted through speakers or because of noise in the vehicle 20. The transducers 34 thereby increase the enjoyment or entertainment of the driver (or passengers where the same system is applied to passenger seats).

Microphone

According to an exemplary embodiment, a sensor 80 includes a microphone. The microphone sensor 80 is positioned adjacent the driver's head, for instance, and measures music and/or other sound such as noise in the vehicle 20. Thereby, the microphone sensor 80 measures vehicle music and/or noise that is perceived by the driver. For example, if, based on output data 82 from the microphone sensor 80, the computing device 90 calculates a threshold amount of vehicle noise (or a threshold noise-to-music ratio), the computing device 90 selects a control signal 92 such that the driver does not feel vibration from the transducers 34 (i.e., the feature is disabled).

Situation Alert

According to an exemplary embodiment, the sensor 80 is a camera (e.g., an environmental sensor) that is configured to measure a distance to one or more vehicles or objects in the proximity of the vehicle 20 (e.g., environmental characteristics 76). For purposes of description of this embodiment, the sensor 80 is referred to as a camera sensor 80.

The camera sensor 80 measures at least one distance to an environmental characteristics 76, and transmits distance output data 82 to the computing device 90. The computing device 90 includes a collision control signal application 120 that is configured to identify collision metrics that determine when a driver should be alerted of an imminent collision between the vehicle 20 and another vehicle, or another object. If the collision control signal application 120 identifies a collision metric in the distance output data 82, the computing device 90 generates an alert control signal 92 that is transmitted to the array of transducers 34 to cause the transducers 34 to vibrate and thereby alert the driver of an imminent collision.

For example, metrics include any combination of one or more of distance, velocity, and acceleration of a proximate vehicle or object; estimated time to collision; and the like.

According to one embodiment, a predefined control signal 92 is selected if a collision metric of "distance (d) is less than a threshold distance (dt)" is identified in the distance output data 82. Referring to the graphical function 300 in FIG. 4, the predefined control signal 92 is amplified (amplitude (a), or (a)) based on the distance (d) identified in the distance output data 82. As such, the frequency content of the predefined control signal 92 is the same but it is more strongly felt by a driver as the vehicle 20 nears an object. Moreover, the increase in amplitude conveys a perception of distance or time to collision.

In addition, the alert control signal 92 may be selected (i.e., generated) so as to be distinguished from other control signals 92 (e.g., those described below re: drowsiness) and other vibrations transmitted by the transducers 34 (e.g., those described above regarding music). Referring to FIG. 5, the conversion chart 400 includes a metric column 402 and a control signal column 404. The metric column 402 includes a list of metrics 410, 412, 414, 416 and an alert control signal 92 that is selected if a metric is identified in the distance output data 82. In this way, different alert control signals 92 can be used to communicate different events to the driver (e.g. similar to the way different alerts on a smartphone are used to communicate and differentiate between receipt of an email, receipt of a text message, phone call, and the like).

As is shown in FIG. 5, the control signal 92 can include a single frequency or can be a complex broadband audio signal. The control signal 92 can vary over time.

The metrics may be found in the distance output data 82, from the same one of the sensors 80 or different ones of sensors 80.

According to another embodiment, a sensor 80 is configured to measure the tiredness or drowsiness of a driver. For example, a drowsiness sensor is a camera sensor 80. The computing device 90 receives or accesses drowsiness environmental characteristics 76 (e.g., facial or body expressions) measured by the camera sensor 80. The computing device 90 includes a drowsiness control signal application 120 that is configured to identify when a driver should be alerted of the driver's drowsiness. If the drowsiness control signal application 120 identifies certain metrics in the drowsiness environmental characteristics 76, the computing device 90 generates an alert control signal 92 that is transmitted to the array of transducers 34 to cause the transducers 34 to vibrate to alert the driver of the driver's drowsiness.

In alternative embodiments, an alert control signal 92 is based on swerving or failure to maintain lane, which are metrics that identify drowsiness. In such embodiments, the computing device 90 accesses or receives output data 82 from a sensor 80 that measures the performance of vehicle systems 70 that may include, individually or in combination, a steering system, a global positioning system, a camera, and the like.

Referring again to FIG. 5, for example, when the driver is in a sleepy state (e.g., metric 412), the control signal application 120 causes the processor 100 to generate an alert control signal 92 (selected based on metric 412) and transmit the alert control signal 92 to the transducers 34. The transducers 34 vibrate according to the alert control signal 92 and otherwise move in a particular manner to wake up the driver.

Engine Enhancement

According to an embodiment, sensors 80 are configured to measure system characteristics 74 including rotations per minute (rpm), speed, throttle, gear, and engine noise. For example, engine noise is measured by a sensor 80 including a microphone.

In such embodiments, vehicle systems 70 include engine systems and the like.

The output—e.g., the output data 82—is received or accessed by the computing device 90. The computing device 90 includes an engine enhancement control signal application 120 that generates an engine enhancement control signal 92 based on the output data 82. For example, the engine enhancement control signal 92 is based on a function or table.

The engine enhancement control signal 92 is transmitted to the array of transducers 34. The transducers 34 enhance the engine noise to give the driver a sense of power.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A vehicle apparatus, comprising:
   a transducer configured to provide a vibration sensible by a person;
   a sensor configured to measure characteristics indicative of at least one of a vehicle system function, a vehicle environment, and a driver state; and
   a computing device comprising a processor and a memory including computer-executable instructions that, when executed by the processor, cause the processor to perform operations comprising:
      receiving output data generated by the sensor of the vehicle apparatus;
      analyzing the output data to identify a collision metric, the collision metric comprising one of:
         a distance to a proximate object;
         a velocity of the proximate object;
         an acceleration of the proximate object; and
         an estimated time to a potential collision with the proximate object;
      determining, if a collision metric is identified, a transducer control signal; and
      transmitting the transducer control signal to the transducer for producing the vibration corresponding to the transducer control signal.

2. The vehicle apparatus of claim 1, wherein the operation of determining the transducer control signal further comprises selecting, based on a value in the output data indicating the distance to the proximate object, an amplitude for the selected transducer control signal.

3. The vehicle apparatus of claim 1, wherein the sensor is a camera configured to measure distance to the proximate object from a vehicle in which the vehicle apparatus is implemented.

4. The vehicle apparatus of claim 1, further comprising a seat, wherein the transducer is positioned on or in the seat for providing the vibration to the person while the person is seated.

5. A vehicle apparatus, comprising:
a tactile transducer configured to provide a vibration to a person sitting in a seat;
a vehicle audio system; and
a computing device comprising a processor and a memory including computer-executable instructions that, when executed by the processor, cause the processor to perform operations comprising:
receiving an audio signal that is input to the vehicle audio system or output by the vehicle audio system; and
transmitting the audio signal to the tactile transducer for producing the vibration corresponding to the audio signal.

6. The vehicle apparatus of claim 5, the operations comprising filtering the audio signal received.

7. The vehicle apparatus of claim 5, wherein:
the memory comprises a noise-to-signal ratio threshold; and
the operations further comprise:
measuring, by a microphone, the audio signal output by the vehicle audio system;
determining a ratio of noise to signal of the measured audio signal; and
discontinuing transmitting, if the ratio exceeds the threshold ratio, the audio signal to the tactile transducer.

8. The vehicle apparatus of claim 5, further comprising the seat, wherein the tactile transducer is positioned on or in the seat for providing the vibration to the person while the person is seated.

9. The vehicle apparatus of claim 1, wherein the operation of determining the transducer control signal comprises selecting from a set of distinct control signals based on a metric of a set of metrics that is identified in the output data, wherein the set of metrics includes the collision metric.

10. The vehicle apparatus of claim 9, wherein the set of metrics include at least one of a drowsiness metric, a swerving metric, and a failure to maintain lane metric.

11. The vehicle apparatus of claim 10, the operations further comprising:
analyzing the output data to identify one of the set of metrics;
determining, if one of the set of metrics is identified, a transducer control signal from the set of distinct control signals; and
transmitting the transducer control signal to the transducer for producing the vibration corresponding to the transducer control signal.

12. The vehicle apparatus of claim 10, wherein the sensor includes at least one of a steering system sensor, a global positioning system, and a camera.

13. The vehicle apparatus of claim 5, wherein the vehicle audio system is a music system, an entertainment system, or a radio.

14. The vehicle apparatus of claim 6, wherein the audio signal is filtered by an equalizer.

15. The vehicle apparatus of claim 6, wherein the audio signal is filtered by a low pass filter.

16. The vehicle apparatus of claim 6, wherein the audio signal is filtered to include frequencies in a range of 20-100 Hertz.

17. The vehicle apparatus of claim 5, wherein:
the memory comprises a noise threshold; and
the operations further comprise:
measuring, by a microphone, a vehicle noise; and
discontinuing transmitting, if the vehicle noise exceeds the noise threshold, the audio signal to the tactile transducer.

18. A vehicle apparatus, comprising:
a tactile transducer configured to provide a vibration to a person sitting in a seat;
a sensor configured to produce an engine signal of a vehicle engine system; and
a computing device comprising a processor and a memory including computer-executable instructions that, when executed by the processor, cause the processor to perform operations comprising:
receiving the engine signal from the sensor; and
transmitting the engine signal to the tactile transducer for providing the vibration corresponding to the engine signal to the person sitting in the seat.

19. The vehicle apparatus of claim 18, wherein the engine signal is one of rotations per minute, speed, throttle, gear, and engine noise.

20. The vehicle apparatus of claim 18, wherein the engine signal is engine noise and the sensor is a microphone.

* * * * *